United States Patent
Prakash (10) Patent No.: US 10,076,702 B2
(45) Date of Patent: Sep. 18, 2018

(54) SETTING UP GAMING SESSIONS TO REDUCE WAITING TIME

(71) Applicant: SONY INTERACTIVE ENTERTAINMENT AMERICA LLC, San Mateo, CA (US)

(72) Inventor: Ramana Bangalore Prakash, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 196 days.

(21) Appl. No.: 15/051,575

(22) Filed: Feb. 23, 2016

(65) Prior Publication Data
US 2017/0239564 A1   Aug. 24, 2017

(51) Int. Cl.
| A63F 13/25 | (2014.01) |
| A63F 13/31 | (2014.01) |
| A63F 13/35 | (2014.01) |

(52) U.S. Cl.
CPC .............. *A63F 13/31* (2014.09); *A63F 13/25* (2014.09); *A63F 13/35* (2014.09)

(58) Field of Classification Search
CPC ........... A63F 13/25; A63F 13/31; A63F 13/35
See application file for complete search history.

(56) References Cited

U.S. PATENT DOCUMENTS

| RE45,040 E * | 7/2014 | Fish ........................ A63F 13/87 463/42 |
| 2006/0287096 A1 | 12/2006 | O'Kelley, II et al. |
| 2006/0287106 A1 * | 12/2006 | Jensen .................... G07F 17/32 463/42 |
| 2010/0184517 A1 | 7/2010 | Danieli et al. |
| 2010/0227691 A1 * | 9/2010 | Karsten ................... G07F 17/32 463/42 |
| 2017/0239563 A1 * | 8/2017 | Prakash .................. A63F 13/25 |
| 2018/0065048 A1 * | 3/2018 | Lebrun ................... H04L 69/24 |

OTHER PUBLICATIONS

International Search Report and Written Opinion for International Application No. PCT/US2017/017129 dated May 1, 2017 from the US International Search Authority.

* cited by examiner

*Primary Examiner* — Corbett B Coburn
(74) *Attorney, Agent, or Firm* — Procopio, Cory, Hargreaves & Savitch LLP (57) ABSTRACT

A method for setting up a multiplayer gaming session, the method including: initiating a multiplayer gaming session by a host computing device; generating a list of games and selecting a game from the list of games on the host computing device; determining a list of invitees; generating a group of game configuration options for the selected game by the host computing device; sending a preliminary invitation to the multiplayer gaming session to each invitee of the list of invitees; launching the selected game on an invitee computing device of each invitee of the list of invitees; selecting game configuration options from the generated group of game configuration options; sending a final invitation to the multiplayer gaming session to each invitee of the list of invitees.

20 Claims, 7 Drawing Sheets

SETTING UP GAMING SESSIONS TO REDUCE WAITING TIME

BACKGROUND

Field of the Invention

The present application relates to online gaming environments, and more specifically, to multiplayer gaming sessions.

Background

Multiplayer gaming sessions involve multiple players playing a game across a network. A host may create a multiplayer gaming session, select a game for the multiplayer gaming session, and invite other players to the session. Different games may require varying loading times, which may lead to unnecessary delays in creating and joining a multiplayer gaming session.

SUMMARY

Implementations of the present application provide for the creation and configuration of multiplayer gaming sessions.

In one implementation, provided is a method for setting up a multiplayer gaming session, the method including: initiating a multiplayer gaming session by a host computing device; generating a list of games and selecting a game from the list of games on the host computing device; determining a list of invitees; generating a group of game configuration options for the selected game by the host computing device; sending a preliminary invitation to the multiplayer gaming session to each invitee of the list of invitees; launching the selected game on an invitee computing device of each invitee of the list of invitees; selecting game configuration options from the generated group of game configuration options; and sending a final invitation to the multiplayer gaming session to each invitee of the list of invitees.

In another implementation, provided is a non-transitory computer-readable storage medium storing a computer program, the computer program including executable instructions that cause a computer to: initiate a multiplayer gaming session by a host computing device; generate a list of games and selecting a game from the list of games on the host computing device; determine a list of invitees; generate a group of game configuration options for the selected game by the host computing device; send a preliminary invitation to the multiplayer gaming session to each invitee of the list of invitees; launch the selected game on an invitee computing device of each invitee of the list of invitees; select game configuration options from the generated group of game configuration options; and send a final invitation to the multiplayer gaming session to each invitee of the list of invitees.

In yet another implementation, provided is a host computing device for setting up a multiplayer gaming session, the host computing device including: a game session generator configured to initiate a multiplayer gaming session, generate a list of games, and select a game from the list of games; an invitee generator configured to determine a list of invitees; a game configuration generator configured to generate a group of game configuration options, and select game configuration options from the generated group of configuration options; and an invitation transmitter configured to send a preliminary invitation to the multiplayer gaming session to each invitee of the list of invitees, launch the selected game on an invitee computing device of each invitee of the list of invitees, and send a final invitation to the multiplayer gaming session to each invitee of the list of invitees.

Other features and advantages of the present application will become more readily apparent to those of ordinary skill in the art after reviewing the following detailed description and accompanying drawings.

DETAILED DESCRIPTION

Certain implementations as disclosed herein provide for multiplayer gaming sessions. After reading this description it will become apparent how to implement the present application in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present application.

Figure 1A:
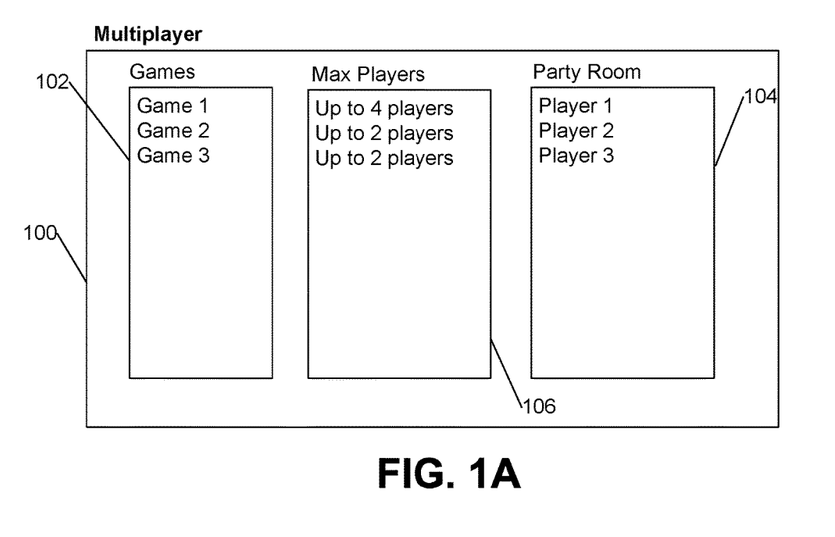
FIG. 1A illustrates a screen shot of a multiplayer gaming session initiation screen in accordance with an implementation of the present application.

FIG. 1A illustrates a screen shot of a multiplayer gaming session initiation screen 100 in accordance with an implementation of the present application. As shown in the figure, the multiplayer gaming session initiation screen 100 may include a game list 102, a maximum player list 106, and a party room 104. When a user or host initiates a multiplayer gaming session, a screen such as the multiplayer gaming session initiation screen 100 may appear on screen.

Game list 102 may be a list of games available to play by the host. In some embodiments, game list 102 is a list of games that has been downloaded or otherwise loaded in a computer system. In other embodiments, game list 102 is a list of games that include games that can be loaded by external media such as a CD, DVD, or a removable storage drive. Game list 102 may be populated by games that support multiplayer modes. Furthermore, game list 102 may be populated by games that support network connected games such as via the internet or via a local area network.

Maximum player list 106 may be a list of the maximum players allowed in a multiplayer gaming session for each game of game list 102. Each entry of maximum player list 106 may correspond to the adjacent game entry of game list 102. In some embodiments, maximum player list 106 may include sub-lists of maximum players allowed for different game modes of each game of game list 102. In some embodiments, the maximum player count for a particular game may be displayed in a different color or format if the amount of players in party room 104 exceeds the maximum player count for the particular game.

Party room 104 may be a list of players available to select by the host. In some embodiments, party room 104 is a list of players connected to a network. In addition, party room 104 may be a list of players connected to the same network as the host. Furthermore, party room 104 may be a pre-selected group of players belonging to the same network group as the host, such as a group of friends connected to an online game server.

Figure 1B:
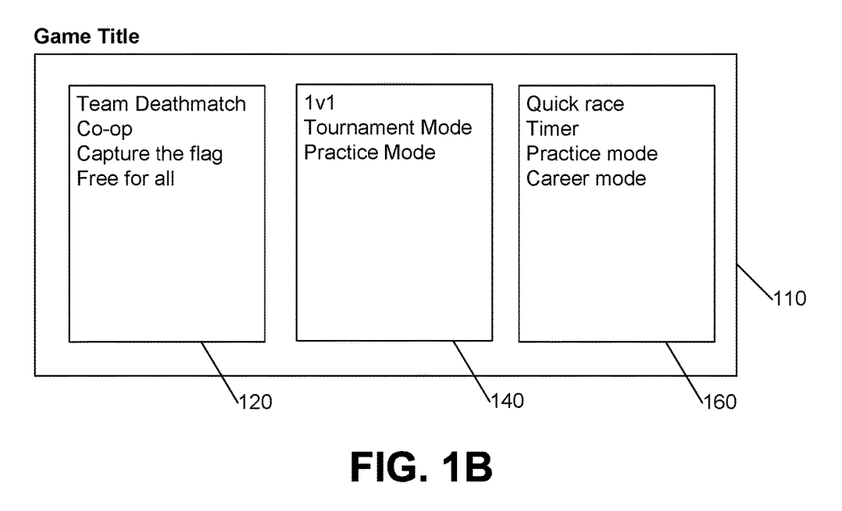
FIG. 1B illustrates a screen shot of a game mode selection screen for a multiplayer gaming session in accordance with an implementation of the present application.

FIG. 1B illustrates a screen shot of a game mode selection screen 110 for a multiplayer gaming session in accordance with an implementation of the present application. The game mode selection screen 110 may include options for game modes that a host can select when setting up a multiplayer gaming session. Furthermore, the game mode selection screen 110 may display a group of game modes pertaining to a particular type of game. Each group illustrated in the figure is an example of a group of game modes that can be displayed in the game mode selection screen 110. For example, game mode selection screen 110 can display a shooter group 120. Shooter group 120 may include game modes designed for multiplayer shooting games. These game modes may include team deathmatch, co-op (cooperation), capture the flag, free for all, etc. As another example, a fighting group 140 may include game modes designed for fighting games. These game modes may include 1v1, tournament mode, practice mode, etc. As another example, a racing group 160 may include game modes designed for racing games. These game modes may include quick race, timer, practice mode, career mode, etc.

Each group may be particular to the game selected. In addition, each game mode of each group may be particular to the game selected. As will be explained further below, the game modes of each group may be pre-defined based on the game selected.

Figure 2A:
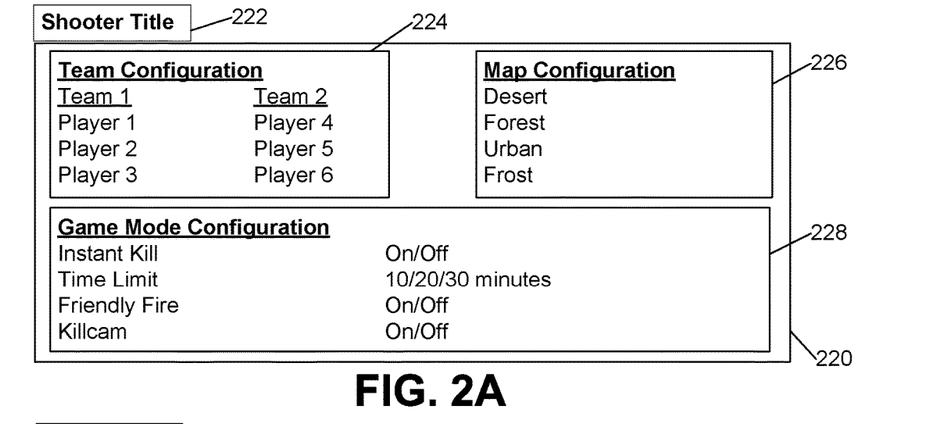
FIG. 2A illustrates a screen shot of a game configuration screen in accordance with an implementation of the present application.

FIG. 2A illustrates a screen shot of a game configuration screen 220 in accordance with an implementation of the present application. Game configuration screen 220 may be displayed on a host computing device. As shown in the figure, game configuration screen 220 may be a screen displayed when choosing a shooter title 222 for a multiplayer gaming session. A shooter title 222 is a game title for a shooter game. Shooter games commonly include combative action involving weapons such as guns. As such, the configuration options for shooter title 222 may be particular to games including combative action involving weapons.

Game configuration screen 220 may include a plurality of configuration groups that a host can use to select options for a multiplayer gaming session. The configuration groups may include a team configuration group 224, a map configuration group 226, and a game mode configuration group 228. Each configuration group includes choices for the host to select. For example, team configuration group 224 is a selection menu to select players for each team in a multi-team multiplayer gaming session for a shooter game. In some embodiments, the players are selected from a list of players such as the players in the party room 104 of FIG. 1A. Furthermore, the amount of teams and amount of players per team may be based upon the game mode selected from shooter group 120 of FIG. 1B. As another example, map configuration 226 is a selection menu to select the map for the multiplayer gaming session. The maps may be different environments designed for a shooter game, such as a "desert" map, a "forest" map, an "urban" map, and a "frost" map. As another example, game mode configuration 228 is a selection menu to select various game mode settings for a multiplayer gaming session. As shown, such game mode settings may be particular to a shooter game, such as "instant kill," "time limit," "friendly fire," and "Killcam." Furthermore, the game mode settings options may be based upon the game mode selected from shooter group 120 of FIG. 1B. In some embodiments, certain game mode settings may be toggled off and on while other game mode settings are selected from a pre-defined list of choices.

Figure 2B:
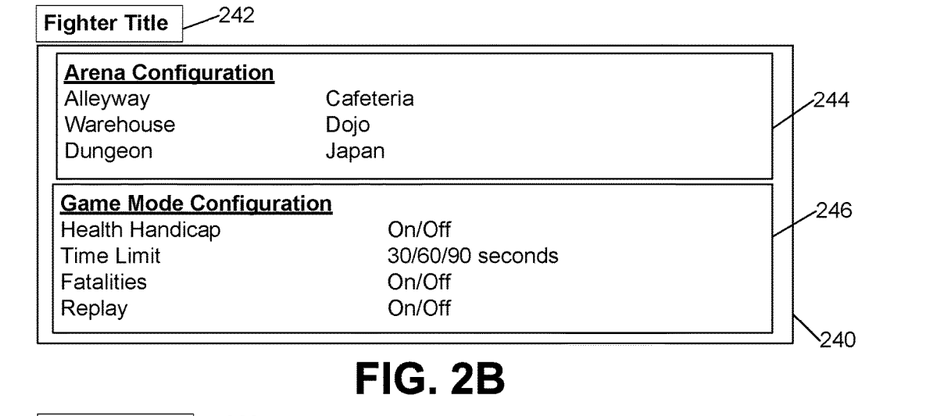
FIG. 2B illustrates a screen shot of a game configuration screen in accordance with an implementation of the present application.

FIG. 2B illustrates a screen shot of a game configuration screen 240 in accordance with an implementation of the present application. Game configuration screen 240 may be displayed on a host computing device. As shown in the figure, game configuration screen 240 may be a screen displayed when choosing a fighter title 242 for a multiplayer gaming session. A fighter title 242 is a game title for a fighter or fighting game. Fighting games commonly include combative action involving at least two players sparring against each other using hand to hand combat or weapons. As such, the configuration options for fighter title 242 may be particular to games including combative action involving sparring.

Game configuration screen 240 may include a plurality of configuration groups that a host can use to select options for a multiplayer gaming session. The configuration groups may include an arena configuration group 244 and a game mode configuration group 246. Each configuration group includes choices for the host to select. For example, arena configuration group 244 is a selection menu to select the arena for the multiplayer gaming session. The arenas may be different stages designed for a fighting game, such as an "alleyway" arena, a "warehouse" arena, a "dungeon" arena, a "cafeteria" arena, a "dojo" arena, and a "Japan" arena. As another example, game mode configuration 246 is a selection menu to select various game mode settings for a multiplayer gaming session. As shown, such game mode settings may be particular to a fighting game, such as "Health handicap," "Time limit," "Fatalities," and "Replay." Furthermore, the game mode settings options may be based upon the game mode selected from fighting group 140 of FIG. 1B. In some embodiments, certain game mode settings may be toggled off and on while other game mode settings are selected from a pre-defined list of choices.

Figure 2C:
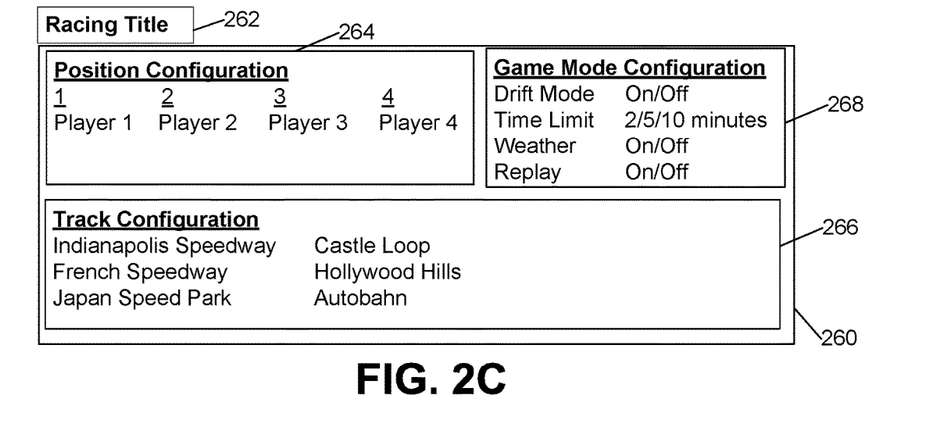
FIG. 2C illustrates a screen shot of a game configuration screen in accordance with an implementation of the present application.

FIG. 2C illustrates a screen shot of a game configuration screen 260 in accordance with an implementation of the present application. Game configuration screen 260 may be displayed on a host computing device. As shown in the figure, game configuration screen 260 may be a screen displayed when choosing a racing title 262 for a multiplayer gaming session. A racing title 262 is a game title for a racing game. Racing games commonly include competitive racing involving at least two players controlling a simulated vehicle in a race to the finish. As such, the configuration options for racing title 242 may be particular to games including competitive racing.

Game configuration screen 260 may include a plurality of configuration groups that a host can use to select options for a multiplayer gaming session. The configuration groups may include a position configuration group 264, a track configuration group 266, and a game mode configuration group 268. Each configuration group includes choices for the host to select. For example, position configuration group 264 is a selection menu to select players for certain starting positions in a multiplayer gaming session for a racing game. In some embodiments, the players are selected from a list of players such as the players in the party room 104 of FIG. 1A. Furthermore, the amount of starting positions and available players may be based upon the game mode selected from racing group 160 of FIG. 1B. As another example, track configuration group 266 is a selection menu to select a track for the multiplayer gaming session. The tracks may be race tracks designed for a racing game, such as an "Indianapolis Speedway" track, a "French Speedway" track, a "Japan Speed Park" track, a "Castle Loop" track, a "Hollywood Hills" track, and an "Autobahn" track. As another example, game mode configuration 268 is a selection menu to select various game mode settings for a multiplayer gaming session. As shown, such game mode settings may be particular to a racing game, such as "Drift Mode," "Time limit," "Weather," and "Replay." Furthermore, the game mode settings options may be based upon the game mode selected from racing group 160 of FIG. 1B. In some embodiments, certain game mode settings may be toggled off and on while other game mode settings are selected from a pre-defined list of choices.

Figure 3A:
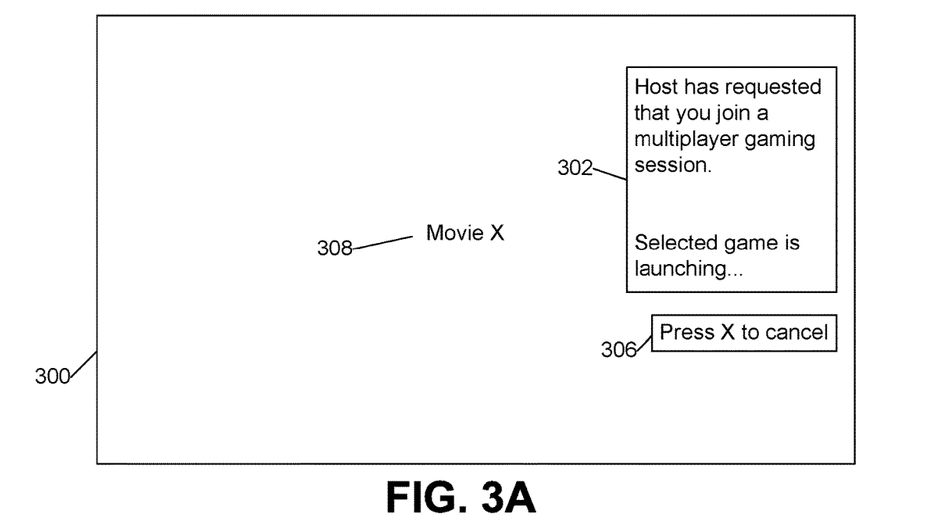
FIG. 3A illustrates a screen shot of an invitation screen on an invitee machine in accordance with an implementation of the present application.

FIG. 3A illustrates a screen shot of an invitation screen on an invitee machine in accordance with an implementation of the present application. As shown, an invitee screen 300 may feature an application 308 running on the invitee machine. In some embodiments, application 308 is a movie, game, TV show, search engine, or a native OS application. Application 308 may be running in the foreground of invitee screen 300. A multiplayer gaming session launch window 302 may be displayed in the background of invitee screen 300. In some embodiments, multiplayer gaming session launch window 302 may be displayed after a host initiates a multiplayer gaming session for a selected game. Furthermore, multiplayer gaming session launch window 302 may be displayed after receiving a preliminary invitation to the multiplayer gaming session by the host. Multiplayer gaming session launch window 302 may display the loading of the selected game for the multiplayer gaming session. In such embodiments, invitee screen 300 may feature a picture-in-picture mode, in which the selected game is launched in a smaller window while application 308 runs in the foreground. In such embodiments, the host may still be selecting game mode options or game configuration options for the multiplayer gaming session. A cancellation window 306 may be displayed in invitee screen 300 near multiplayer gaming session launch window 302. Cancellation window 306 may indicate to the invitee that the invitation to the multiplayer gaming session can be cancelled by pressing a button.

Figure 3B:
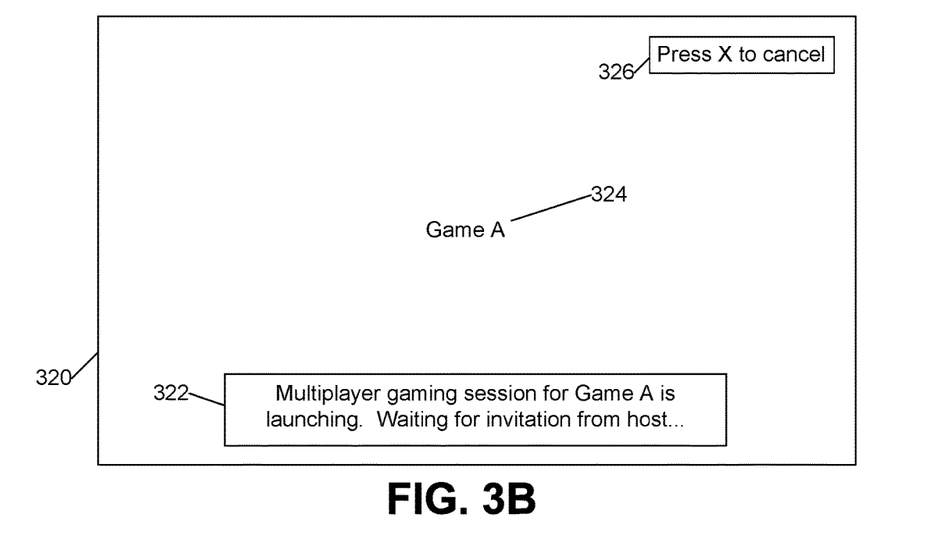
FIG. 3B illustrates a screen shot of an alternative invitation screen on an invitee machine in accordance with an implementation of the present application.

FIG. 3B illustrates a screen shot of an alternative invitee screen on an invitee machine in in accordance with an implementation of the present application. As shown in the figure, an invitee screen 320 on the invitee machine may feature a selected game 324 running in the foreground of invitee screen 320. Selected game 324 may be the selected game selected for a multiplayer gaming session by a host. In some embodiments, selected game 324 is launching after the host sends a preliminary invitation for the multiplayer gaming session to the invitee. Furthermore, a multiplayer gaming session launch window 322 may be displayed to indicate the launching of selected game 324. Multiplayer gaming session launch window 302 may indicate to the invitee that a final invitation is pending from the host. In such embodiments, the host may still be selecting game mode options or game configuration options for the multiplayer gaming session. A cancellation window 326 may be displayed in invitee screen 320. Cancellation window 326 may indicate to the invitee that the preliminary invitation to the multiplayer gaming session can be cancelled by pressing a button.

Figure 4:
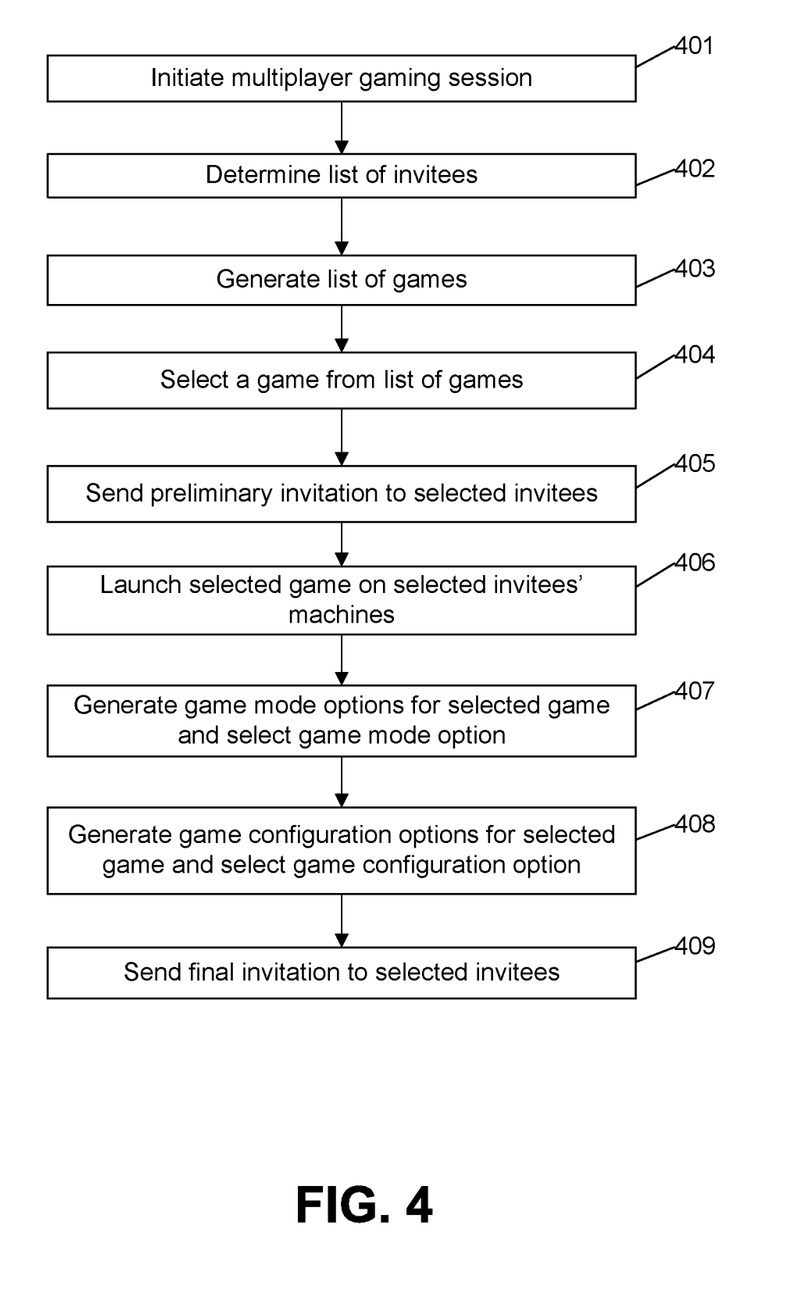
FIG. 4 illustrates a flowchart showing a method of setting up a multiplayer gaming session in accordance with an implementation of the present application.

FIG. 4 illustrates a flowchart showing a method of setting up a multiplayer gaming session in accordance with an implementation of the present application. In one implementation, setting up the multiplayer gaming session may start at step 401, but may also start from anywhere else in FIG. 4. The below described steps may also be performed in any order.

At step 401, a host may initiate a multiplayer gaming session. In some embodiments, the host may initiate the multiplayer gaming session from the native operating system of a gaming console. For example, the host may initiate the multiplayer gaming session from the home screen of the Playstation® 4 operating system. In some embodiments, the host initiates the multiplayer gaming session after connecting to an online network via the gaming console. The host may also initiate the multiplayer gaming session after organizing a group of players into a party. In some embodiments, the multiplayer gaming session is referred to as a "Play Together" session.

Initiating the multiplayer gaming session from a native OS of a gaming console may allow for all other steps 402-409 to also be performed via the native OS. The native OS can interface with a server to gather information for the initiation and creation of the multiplayer gaming session. In some embodiments, the server can act as a host to initiate and create the multiplayer gaming session.

At a step 402, the host may determine a list of invitees. The list of invitees may be derived from a list of players on a network, such as the Playstation® Network. In one implementation, the list of invitees is similar to the party room 104 of FIG. 1A. For example, the host may join party room 104 and may select invitees from players in party room 104.

At a step 403, the host may be presented with a list of games. The list of games may be generated by a system, such as a computer system 600 as will be explained further below. In one implementation, the list of games presented is similar to the game list 102 of FIG. 1A. The list of games may correlate to a library of games owned by the host. In some embodiments, the list of games is games that have been downloaded or otherwise loaded in a computer system. In other embodiments, the list of games is games that can be loaded by external media such as a CD, DVD, or a removable storage drive. In further embodiments, the list of games is games that can be purchased and/or downloaded from a network server.

At a step 404, the host may select a game from a list of games. The list of games may be the list of games generated at step 403. In some implementations, upon selection of the game, the game may or may not be launched on the host machine.

At a step 405, the host may send a preliminary invitation to selected invitees. The selected invitees may be the list of invitees selected at step 402. In some embodiments, the preliminary invitation is automatically sent to the selected invitees after selecting a game from a list of games, such as at step 404. Additionally, the preliminary invitation may be sent out by the native OS of a host computing device or by the game software of the selected game.

In one implementation, the preliminary invitation is a message sent to each invitee. The message may notify, instruct, summon, propose, or otherwise invite each invitee to join a multiplayer gaming session.

At a step 406, the selected game is launched on selected invitees' machines. The selected invitees may be the invitees selected at step 402. The selected game may be launched on the machines of the selected invitees after receiving a preliminary invitation, such as at step 405. Each invitee machine may be an invitee computing device. In some embodiments, the selected game is launched simultaneously on the selected invitees' machines when receiving the preliminary invitation. The launching of the selected game may appear on the invitees' machines as shown in FIG. 3A or 3B.

For example, as shown in FIG. 3A, the invitee may be engaged in an activity on his machine, such as watching a movie. The movie may be an application running in the foreground of the screen of the invitee's machine. While watching the movie, the invitee may be invited to a party room, such as the party room 104 of FIG. 1A. Additionally, the invitee may be sent a preliminary invitation to a multiplayer gaming session by a host belonging to the same party room. The text "Host has requested you join a multiplayer gaming session" may be displayed on the invitee's screen. While the invitee is still watching the movie, the selected game of the multiplayer gaming session may launch on the invitee's machine. The launching of the selected game may appear in a window in the background of the movie. In some embodiments, the launching of the selected game may appear in a window in the foreground of the movie.

As another example, as shown in FIG. 3B, the invitee may not be engaged in an activity on his machine. In such an embodiment, the invitee may receive the preliminary invitation to the multiplayer gaming session, and the selected game of the multiplayer gaming session may launch on the invitee's machine. As shown, the launching of the selected game may appear in the foreground of the screen of the invitee's machine. A toast message may appear near the top or bottom of the screen, which may read "Multiplayer gaming session will start soon. Waiting for final invitation from host . . . " In other embodiments, the invitee may be engaged in an activity on his machine, such as watching a movie, in which receiving the preliminary invitation will stop the movie and launch the selected game.

In addition, at step 406, each selected invitee may cancel the launching of the selected game. For example, a cancellation window, such as cancellation window 306 and 326 of FIG. 3A and FIG. 3B, respectively, may indicate to the invitee that a button may be pressed to cancel the launching process. In some embodiments, the launching process may be cancelled by the host. The launching process may be cancelled by the host by cancelling the multiplayer gaming session set up process, or by prolonged delay in setting up the multiplayer gaming session.

At a step 407, a group of game mode options may be generated for a selected game in which one of the game mode options is selected. The selected game may be the game selected at step 404. In addition, the generated game mode options may be presented to the host for selection. While selecting the game mode options, the selected game may be simultaneously launched on a host computing device. In other instances, the game may be launched on the host computing device before or after selecting the game mode options.

Figure 6A:
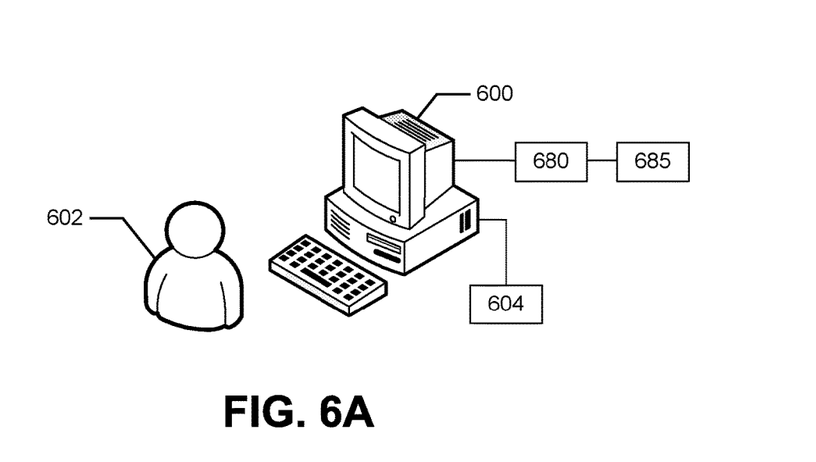
FIG. 6A illustrates a representation of a computer system and a user in accordance with an implementation of the present application.

In some embodiments, the group of game mode options may be generated by a computer system, such as computer system 600 of FIG. 6A. In such instances, the computer system may generate game mode options by retrieving the game mode options from a database or a storage medium.

In one implementation, the game mode options may be located in a file stored in a removable storage medium. For example, the file may be retrieved from an external medium such as a CD, DVD, or some type of removable storage device (such as USB). In further embodiments, the external medium may also contain the software program of the selected game. In further embodiments, the external medium is a CD or DVD that is loaded into a computer system having a CD or DVD drive. The file may be a configuration file stored in the external medium. In some embodiments, the configuration file may be referred to as a "game mode configuration file" or a "GM configuration file". Upon selection of the game by the host, the computer system may retrieve or search for the configuration file located in the external medium. After retrieval of the configuration file, the game mode options may be loaded into the computer system and displayed to the host. The game mode options may be displayed in the user interface ("UI") of a native operating system of a gaming console. The game mode options may be displayed as a selection screen when setting up a multiplayer gaming session within the native operating system of the gaming console.

In one implementation, the game mode options may be stored in a plurality of configuration files. In some embodiments, the file is a packaged file which includes the plurality of configuration files. In such embodiments, the plurality of configuration files may be extracted out of the packaged file.

In one implementation, the game mode options may be located in a file stored in a database. For example, the file may be stored in a database located in a network. A computer system, such as computer system 600 of FIG. 6A, may be connected to the network. The computer system may be configured to search for the file in the database and retrieve the contents of the file. In some embodiments, the database may be located on a server connected to the network. In such embodiments, the server may be a server hosted in a cloud network. In some embodiments, the file is located in a network storage device. In some embodiments, the file is located on a separate file system.

At a step 408, at least one group of game configuration options may be generated for a selected game to determine the game configuration. In some embodiments, a plurality of game configuration option groups is generated. The selected game may be the game selected at step 404. In addition, the generated game configuration options may be presented to the host for selection. While selecting the game configuration options, the selected game may be simultaneously launched on a host computing device. In other instances, the game may be launched on the host computing device before or after selecting the game configuration options.

Similar to step 407, the group of game mode options may be generated by a computer system, such as computer system 600 of FIG. 6A. In addition, the group of game configuration options may be retrieved from a database or storage medium.

In one implementation, the game configuration options may be located in a file stored in a removable storage medium. For example, the file may be retrieved from an external medium such as a CD, DVD, or some type of removable storage device (such as USB). In further embodiments, the external medium may also contain the software program of the selected game. In further embodiments, the external medium is a CD or DVD that is loaded into a computer system having a CD or DVD drive. The file may be a configuration file stored in the external medium. In some embodiments, the configuration file may be referred to as a "game configuration configuration file" or a "GC configuration file". Upon selection of the game by the host, the computer system may retrieve or search for the configuration file located in the external medium. After retrieval of the configuration file, the game configuration options may be loaded into the computer system and displayed to the host. The game configuration options may be displayed in the user interface ("UI") of a native operating system of a gaming console. The game configuration options may be displayed as a selection screen when setting up a multiplayer gaming session within the native operating system of the gaming console.

In one implementation, the game configuration options may be located in a file stored in a database. For example, the file may be stored in a database located in a network. A computer system, such as computer system 600 of FIG. 6A, may be connected to the network. The computer system may be configured to search for the file in the database and retrieve the contents of the file. In some embodiments, the database may be located on a server connected to the network. The server may be connected to a cloud network.

In some embodiments, the generation of game mode options and game configuration options are combined in one step. The generated game mode options may be included in the generated game configuration options, or vice versa. One file may contain both game mode options and game configuration options. An existing file located in an external medium or database may contain the game mode option file and/or the game configuration option file.

In some embodiments, the generated game mode options are displayed first to the host on one screen, and the generated game configuration options are displayed second to the host on a different screen. In other embodiments, the generated game mode options and the generated game configuration options are all displayed on the same screen to the host.

In some embodiments, the generated game mode options also include generating the maximum supported player count for each game mode. The maximum supported player count may be displayed to the host such as maximum player list 106 shown in FIG. 1A. The maximum supported player count for each game mode may also be included in the file containing the game mode options and/or game configuration options. In some embodiments, a decision is made whether the maximum supported player count for a selected game is equal to or greater than the amount of invitees from a list of invitees. If the maximum supported player count for the selected game is equal to or greater than the list of invitees, then all invitees from the list of invitees are automatically invited to the multiplayer gaming session. If the maximum supported player count for the selected game is less than the list of invitees, then the host is requested to re-select invitees from the list of invitees. This may be due to the lack of space in the selected game for additional players beyond the maximum supported player count in a multiplayer gaming session. In some embodiments, the host may be requested to choose invitees from the list of invitees regardless of the comparison between the maximum supported player count for the selected game and the list of invitees.

In some embodiments, the host may be requested to choose invitees from the list of invitees regardless of the comparison between the maximum supported player count for the selected game and the list of invitees. In some embodiments, the host may choose more invitees than the maximum supported player count in case one of the invitees is not available.

At a step 409, the host may send final invitations to the multiplayer gaming session to selected invitees. The selected invitees may be the selected invitees at step 402. In some embodiments, the final invitation is sent after the host finishes selecting the game configuration options. The final invitation may be sent by the native OS of a host computing device or by the game software of the selected game.

In one implementation, the final invitation is a message sent to each invitee. The message may notify, instruct, summon, propose, or otherwise invite each invitee to join a multiplayer gaming session.

In one implementation, after receiving the final invitation, each invitee machine will automatically load into the multiplayer gaming session with the game configuration options selected by the host. The selected game may be finished launching upon reception of the final invitation. As such, the multiplayer gaming session can immediately commence for all players in a party room, such as the party room 104 of FIG. 1A. The multiplayer gaming session can immediately commence with the selected game configuration options.

Figure 5:
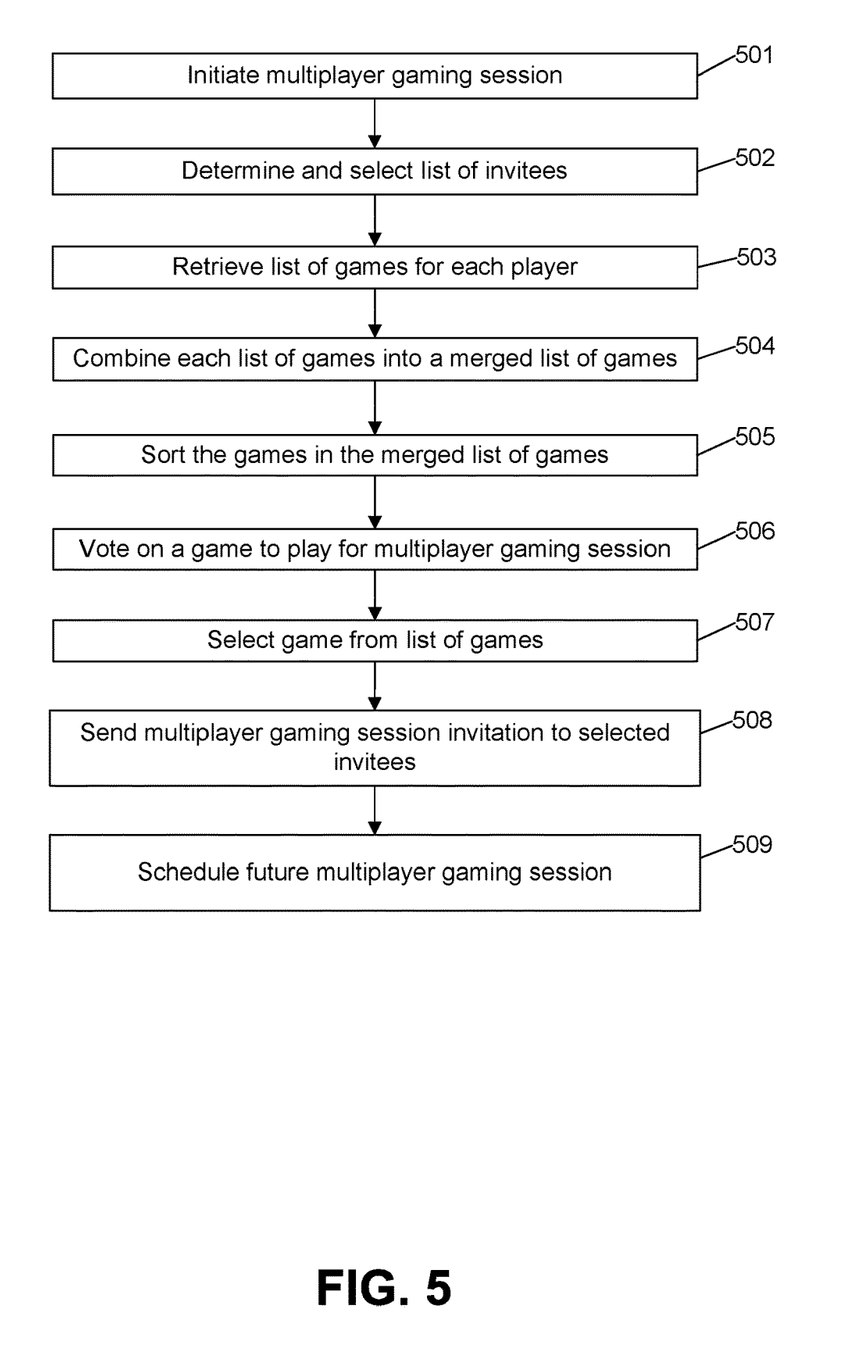
FIG. 5 illustrates a flowchart showing a method of setting up a multiplayer gaming session in accordance with an implementation of the present application.

FIG. 5 illustrates a flowchart showing a method of setting up a multiplayer gaming session in accordance with an implementation of the present application. In one implementation, inviting invitees to the multiplayer gaming session may start at step 501, but may also start from anywhere else in FIG. 5. The below described steps may also be performed in any order.

At step 501, a host may initiate a multiplayer gaming session. In some embodiments, the host may initiate the multiplayer gaming session from the native operating system of a gaming console. For example, the host may initiate the multiplayer gaming session from the home screen of the Playstation® 4 operating system. In some embodiments, the host initiates the multiplayer gaming session after connecting to an online network via the gaming console. The host may also initiate the multiplayer gaming session after organizing a group of players into a party. In some embodiments, the multiplayer gaming session is referred to as a "Play Together" session.

Initiating the multiplayer gaming session from a native OS of a gaming console may allow for all other steps 502-509 to also be performed via the native OS. The native OS can interface with a server to gather information for the initiation and creation of the multiplayer gaming session. In some embodiments, the server can act as a host to initiate and create the multiplayer gaming session.

At a step 502, the host may determine and select a list of invitees. The list of invitees may be derived from a list of players on a network, such as the Playstation® Network. In one implementation, the list of invitees is similar to the party room 104 of FIG. 1A. For example, the host may join party room 104 and may select invitees from players in party room 104.

At a step 503, the host may retrieve a list of games for each player in a group. The group may be the list of invitees selected at step 502. Furthermore, each list of games may be generated by a system, such as a computer system 600 as will be explained further below. In one implementation, the list of games presented is similar to the game list 102 of FIG. 1A. The list of games may correlate to a library of games owned by the host and each of the selected invitees. In some embodiments, the list of games is games that have been downloaded or otherwise loaded in a computer system. In other embodiments, the list of games is games that can be loaded by external media such as a CD, DVD, or a removable storage drive. In further embodiments, the list of games is games that can be purchased and/or downloaded from a network server.

The list of games for each player may be stored in a database. The host may retrieve the list of games for each player through a server in communication with the database. The server may retrieve the list of games for each player from the database and send it to the host. In some embodiments, each player of the group has a unique list of games owned by the specific player stored in the database. Each unique list of games may be stored as a file in the database. In some embodiments, each unique list may be linked to an individual user account for each player in the group.

At a step 504, each list of games for each player in a group may be combined into a merged list of games. The list of games for each player in the group may be the list of games generated at step 503. The merged list of games is a cumulative list of games owned by all players in a group, such as the host and the list of invitees at step 502. The merged list of games may be displayed in a list format such as shown in game list 102 of FIG. 1A. The merged list may be presented as a collated list of games to the host, in which each game is displayed only once. In addition, the system may count and tally the number of times each game is found in the merged list of games and display the tally next to each game.

In one implementation, the owners of each game of the merged list of games may be presented to the host in a manner readily apparent to the host. The host may select, point, or otherwise focus on one of the games in the merged list of games, in which a small window or dialog box may be displayed next to the game. The small window or dialog box may display each player owning the game. In addition, the small window or dialog box may display each player that does not own the game. By displaying the ownership of each game, the host may be more informed when deciding which game to choose for the multiplayer gaming session.

At a step 505, a merged list of games may be sorted in a certain order, such as from top to bottom. The merged list of games may be the merged list of games at step 504. In some embodiments, the merged list of games may be sorted by most commonly owned game. For example, if one of the games in the merged list of games is owned by all the players in the group, it will be displayed at the top of the list. In some embodiments, the merged list of games may be sorted by most recently played. In some embodiments, the merged list of games may be sorted by most frequently played. In some embodiments, the merged list of games may be sorted by most multiplayer gaming sessions played. In some embodiments, the merged list of games may be sorted by at least two of the above sorting methods.

In embodiments where the merged list of games are sorted by most commonly owned games, the games that are all commonly owned by players in the group are displayed differently than the games that are not all commonly owned. For example, the games that are all commonly owned may be highlighted, bolded, presented in a different color, or otherwise displayed in a conspicuous manner. In some embodiments, the games that are not all commonly owned may be presented in a dimmed or inconspicuous manner. In some embodiments, the more a game is commonly owned, the more the game is conspicuously presented. For example, the merged list of games may be shown as a list sorted from most commonly owned to least commonly owned, in which the games are presented from bright to dim.

In one implementation, games that are not owned by one of the players in the group may be offered for sale to the player. A small notification or message may be presented to the player that indicates the player does not own the game(s) and may purchase the game. A portal, website, or shortcut link may be provided to the player to allow the player to purchase the game. In some embodiments, after purchasing the game, the host may be able to choose a game that is commonly owned my all players in the group.

At a step 506, a voting process may be performed to choose a most desired game for the multiplayer gaming session. The voting process may be performed by a system, such as computer system 600. The system may send a voting poll to each player in a group, such as the selected invitees at step 502. Each player may be presented with a list of games to choose from, such as the merged list of games at step 504. The merged list of games may be presented to each player in the group in a sorted manner, such as at step 505. Each player may vote on a game to play for the multiplayer gaming session, in which the system may count the amount of votes per game. Each player may vote on a game that he/she does not own, and may be presented with a link to purchase the game if that game eventually is chosen as the game to play for the multiplayer gaming session. The game with the most amount of votes is determined as the most desired game. The results of the voting process may be displayed to the host. By doing so, the host may be more informed as to which game is more popular amongst the players in the group.

At a step 507, the host may select a game from a list of games. The list of games may be the list of games generated at step 503. In some embodiments, the host may select a game based on the common ownership of the game within a group, such as the host and the selected invitees of step 502. In some embodiments, the host may select a game based on the amount of votes received, such as at step 506.

At a step 508, the host may send an invitation to the multiplayer gaming session to each selected invitee. The selected invitees may be the selected invitees at step 502. The game for the multiplayer gaming session may be the game selected at step 507. The invitation may be sent by the native OS of a host computing device or by the game software of the selected game. In one implementation, the invitation is a message sent to each invitee. The message may notify, instruct, summon, propose, or otherwise invite each invitee to join a multiplayer gaming session.

In some embodiments, sending the invitation includes sending a push notification to each invitee's mobile device. The mobile device may be a cell phone, tablet computer, PDA, or smart phone. Each invitee may receive the push notification and determine whether to accept the invitation to the multiplayer gaming session by using their mobile device. In some embodiments, each invitee can accept the invitation by inputting an affirmative response on their mobile device, in which the mobile device communicates with a gaming device, such as a Sony Playstation®. The mobile device may communicate with a network, such as a home Wi-Fi network, to command the gaming device to boot up. Furthermore, the mobile device may instruct the gaming device to launch into the multiplayer gaming session.

At a step 509, a multiplayer gaming session may be scheduled in advance. In one embodiment, a host may be presented with the option of scheduling the multiplayer gaming session after step 501. In one embodiment, the host may be presented with the option of scheduling the multiplayer gaming session after step 508. In the latter embodiment, the host may invite each invitee to schedule future multiplayer gaming sessions having similar configurations as those selected in steps 501-508. For example, the host may invite the same invitees to join a multiplayer gaming session for the previously selected game every Tuesday at 9 PM. If the invitees agree, the invitees can be sent a recurring invite to the same game every Tuesday at 9 PM.

FIG. 6A illustrates a representation of a computer system 600 and a user 602 in accordance with an implementation of the present application. The user 602 uses the computer system 600 to set up a multiplayer gaming session. The computer system 600 stores and executes a multiplayer gaming session application 690 of FIG. 6B. In addition, the computer system 600 may be in communication with a software program 604. Software program 604 may include the software code for a game. In addition, software program 604 may include a GM configuration file and/or a GC configuration file. The GM configuration file includes game mode parameters and the GC configuration file includes game configuration parameters. The GM configuration file and the GC configuration file may both be an xml file, which include the parameters of the configuration options.

Software program 604 may be loaded on an external medium such as a CD, DVD, or a storage drive, as will be explained further below.

Furthermore, computer system 600 may be connected to a network 680. The network 680 can be connected in various different architectures, for example, a Client Server architecture, a Peer-to-Peer network architecture, or other type of architectures. For example, network 680 can be in communication with a server 685 that coordinates the multiplayer gaming session. Also, the network can be different types of networks. For example, the network 680 can be the Internet, a Local Area Network or any variations of Local Area Network, a Wide Area Network, a Metropolitan Area Network, an Intranet or Extranet, or a wireless network. Also, the term "gaming session" can be used to identify any network topology where different users are connected to a network and to send and receive information from other users connected to the network. In one example, a gaming session can be an online game where users connected to the network send and receive information pertaining to a game.

Server 685 may be in communication with a database. The database may include one or more game information files. Furthermore, the database may include configuration files containing game mode parameters and/or game configuration parameters. Each configuration file may include game mode parameters and/or game configuration parameters for one game or for several games.

Figure 6B:
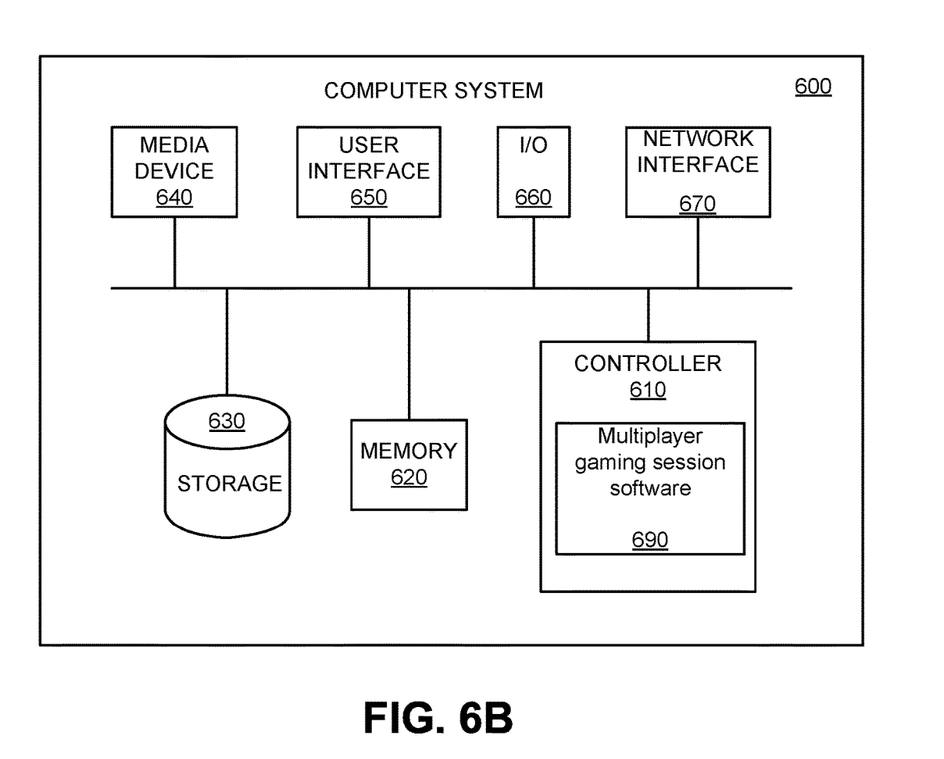
FIG. 6B is a functional block diagram illustrating the computer system hosting a controller in accordance with an implementation of the present application.

FIG. 6B is a functional block diagram illustrating the computer system 600 hosting the multiplayer gaming session application 690 in accordance with an implementation of the present application. A controller 610 is a programmable processor and controls the operation of the computer system 600 and its components. The controller 610 loads instructions (e.g., in the form of a computer program) from the memory 620 or an embedded controller memory (not shown) and executes these instructions to control the system. In its execution, the controller 610 provides the multiplayer gaming session application 690 with a software system, such as to enable the creation and configuration of multiplayer gaming sessions. Alternatively, this service can be implemented as separate hardware components in the controller 610 or the computer system 600.

Memory 620 stores data temporarily for use by the other components of the computer system 600. In one implementation, memory 620 is implemented as RAM. In one implementation, memory 620 also includes long-term or permanent memory, such as flash memory and/or ROM.

Storage 630 stores data either temporarily or for long periods of time for use by the other components of computer system 600. For example, storage 630 stores data used by the multiplayer gaming session application 690. In one implementation, storage 630 is a hard disk drive.

The media device 640 receives removable media and reads and/or writes data to the inserted media. In one implementation, for example, the media device 640 is an optical disc drive.

The user interface 650 includes components for accepting user input from the user of the computer system 600 and presenting information to the user 602. In one implementation, the user interface 650 includes a keyboard, a mouse, audio speakers, and a display. The controller 610 uses input from the user 602 to adjust the operation of the computer system 600.

The I/O interface 660 includes one or more I/O ports to connect to corresponding I/O devices, such as external storage or supplemental devices (e.g., a printer or a PDA). In one implementation, the ports of the I/O interface 660 include ports such as: USB ports, PCMCIA ports, serial ports, and/or parallel ports. In another implementation, the I/O interface 660 includes a wireless interface for communication with external devices wirelessly.

The network interface 670 includes a wired and/or wireless network connection, such as an RJ-45 or "Wi-Fi" interface (including, but not limited to 802.11) supporting an Ethernet connection.

The computer system 600 includes additional hardware and software typical of computer systems (e.g., power, cooling, operating system), though these components are not specifically shown in FIG. 6B for simplicity. In other implementations, different configurations of the computer system can be used (e.g., different bus or storage configurations or a multi-processor configuration). In one implementation, the computer system is a next generation game console from, for example, Sony Playstation®.

In one implementation, multiplayer gaming session application 690 retrieves the game mode configuration file and/or GC configuration file from a source. The source may be one of the components of computer system 600. For example, the configuration file(s) may be stored in an external medium such as a CD or DVD connected to media device 640. Multiplayer gaming session application 690 recognizes that the configuration file(s) are in the CD/DVD connected to media device 640 and can command controller 610 to retrieve the configuration file(s) from media device 640. In some embodiments, the CD/DVD also contains the software code for a game. For another example, the configuration file(s) may be stored in a removable storage device such as a USB drive connected to I/O 660. Multiplayer gaming session application 690 recognizes that the configuration file(s) are in the USB drive connected to I/O 660 and can command controller 610 to retrieve the configuration file(s) from I/O 660. In some embodiments, the USB drive also contains the software code for a game. As another example, the configuration file(s) may be stored in storage 630 and/or memory 620. Multiplayer gaming session application 690 recognizes that the configuration file(s) are stored in storage 630 and/or memory 620 and can command controller 610 to retrieve the configuration file(s) from storage 630 and/or memory 620. In some embodiments, storage 630 and/or memory 620 also contains the software code for a game.

In one implementation, multiplayer gaming session application 690 may command server 685 to access the database and retrieve the GM configuration file and/or the GC configuration file. The multiplayer gaming session application 690 may retrieve the configuration file(s) to generate game mode options and/or game configuration options.

In some embodiments, the multiplayer gaming session application 690 is configured to generate game configuration options that adapt to the selected game. For instance, the multiplayer gaming session application 690 may be configured to retrieve a previously retrieved configuration file. In such instances, the multiplayer gaming session application 690 may recognize that the selected game is a successor game to an older game that already has a configuration file in the database. The game configuration parameters in the older game can be similar to the game configuration parameters of the successor game. As another example, the multiplayer gaming session application 690 may be configured to recognize that the game configuration options of the selected game are similar to the game configuration options of games in the same genre. The multiplayer gaming session application 690 may be configured to retrieve a configuration file having common game configuration parameters for all games of the particular genre.

As another example, the multiplayer gaming session application 690 may be configured to generate a series of instructions to guide the host while selecting the game mode options and/or the game configuration options.

In one implementation, multiplayer gaming session application 690 retrieves a list of games from a source. The source may be a database or storage medium. In some embodiments, multiplayer gaming session application 690 may command server 685 to access the database and retrieve the list of games. The list of games may be connected to an individual user account in a network. Multiplayer gaming session application 690 may also retrieve multiple lists of games, combine them into a single list, and sort the single list. Multiplayer gaming session application 690 may also provide a voting process to determine the desirability of a game.

Figure 7A:
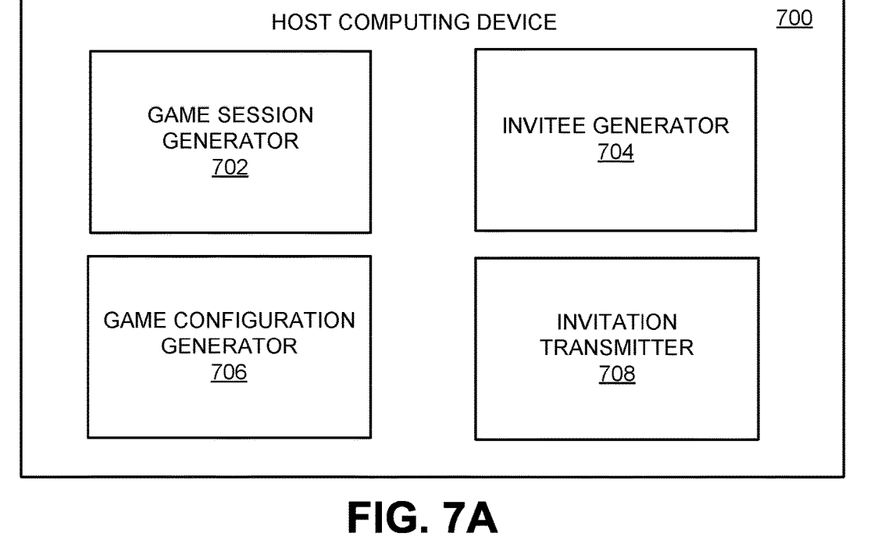
FIG. 7A is a functional block diagram illustrating a host computing device in accordance with an implementation of the present application.

FIG. 7A is a functional block diagram illustrating a host computing device 700 in accordance with an implementation of the present application. Host computing device 700 may embody one configuration of computer system 600 of FIG. 6B. Host computing device 700 may include a game session generator 702, an invitee generator 704, a game configuration generator 706, and an invitation transmitter 708. Game session generator 702 may initiate a multiplayer gaming session. Game session generator 702 may also generate a list of games and select a game from the list of games for the multiplayer gaming session. Invitee generator 704 may determine and select at least one invitee to the multiplayer gaming session. Game configuration generator 706 may generate game configuration options and/or select game configuration options for the selected game. Invitation transmitter 708 may send a preliminary invitation to the multiplayer gaming session to the at least one selected invitee. Invitation transmitter 708 may launch the selected game on an invitee computing device of each invitee of the list of invitees. Invitation transmitter 708 may also send a final invitation to the multiplayer gaming session to the at least one selected invitee.

Figure 7B:
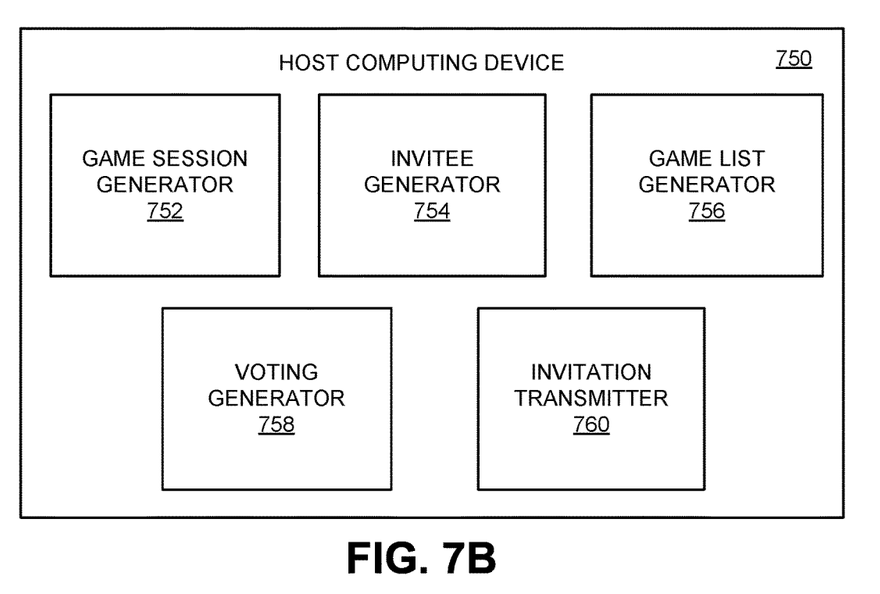
FIG. 7B is a functional block diagram illustrating a host computing device in accordance with an implementation of the present application.

FIG. 7B is a functional block diagram illustrating a host computing device 750 in accordance with an implementation of the present application. Host computing device 750 may embody one configuration of computer system 600 of FIG. 6B. Host computing device 750 may include a game session generator 752, an invitee generator 754, a game list generator 756, a voting generator 758, and an invitation transmitter 760. Game session initiator 752 may initiate a multiplayer gaming session. Invitee generator 754 may generate and select at least one invitee to the multiplayer gaming session.

Game list generator 756 may retrieve and/or generate a list of games. In some embodiments, the list of games are games owned by the at least one selected invitee. In some embodiments, the list of games is retrieved from a server. In addition, game list generator 756 may retrieve and/or generate multiple list of games belonging to the at least one selected invitee. Game list generator 756 may merge the multiple lists of games into a merged list of games. Further, game list generator 756 may sort the merged list of games by a certain order or method. Game list generator 756 may sort the merged list of games by most commonly owned. In such embodiments, game list generator 756 may include a counter to count the amount of times each game appears in a list of games belonging to each invitee of the at least one selected invitees. Game list generator 756 may present the game most commonly owned at the top of the list, or displayed in a conspicuous manner. Game list generator 756 may also select a game from the merged list of games.

Voting generator 758 may generate a voting process for voting on a game of a list of games, such as the merged list of games. Voting generator 758 may generate a poll to count votes for each game of the merged list of games. Voting generator 758 may determine the game with the most votes as the most desired game, and present the most desired game to a host. Invitation transmitter 760 may send an invitation to the multiplayer gaming session to the at least one selected invitee.

In some embodiments, creating and configuring multiplayer gaming sessions according to the implementations of the invention produces many benefits. For example, creating and configuring a multiplayer gaming session using the various steps discussed above can reduce the time expended compared to more traditional methods of creating and configuring multiplayer gaming sessions. A multiplayer gaming session according to the above description can be initiated and configured before the game is launched on a host computing device and/or an invitee computing device. In addition, the multiplayer gaming session can be initiated and configured while the game is launched on the host computing device and/or the invitee computing device. In doing so, the embodiments of the present invention can provide for a quick and convenient method of creating and configuring multiplayer gaming sessions.

The description herein of the disclosed implementations is provided to enable any person skilled in the art to make or use the present application. Numerous modifications to these implementations would be readily apparent to those skilled in the art, and the principals defined herein can be applied to other implementations without departing from the spirit or scope of the present application. For example, although the specification describes multiplayer gaming sessions in the context of online games, these multiplayer gaming sessions can be used with any online or offline activity (offline in being based in an intranet, for example or local home network). In another example, the multiplayer gaming sessions can be used over computers or mobile devices, in addition to game consoles. Thus, the present application is not intended to be limited to the implementations shown herein but is to be accorded the widest scope consistent with the principal and novel features disclosed herein.

Various implementations of the present application are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present application. In addition, the grouping of functions within a module or step is for ease of description. Specific functions can be moved from one module or step to another without departing from the present application.

The methods described herein may be implemented in hardware, software, firmware, or any combination thereof. Such methods may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein.

All features of each above-discussed example are not necessarily required in a particular implementation of the present application. Further, it is to be understood that the description and drawings presented herein are representative of the subject matter which is broadly contemplated by the present application. It is further understood that the scope of the present application fully encompasses other implementations that may become obvious to those skilled in the art and that the scope of the present application is accordingly limited by nothing other than the appended claims.

The invention claimed is:

1. A method for setting up a multiplayer gaming session comprising:
storing a plurality of multiplayer games in a memory;
initiating a multiplayer gaming session by a host computing device via a network connection based on a user input, the host computing device being communicatively coupled to the memory;
generating, by the host computing device, a list of games based on the storing;
receiving an input indicating a selected game from the list of games;
determining, by the host computing device, a list of invitee computing devices based on the network connection;
generating a group of game configuration options for the selected game by the host computing device based on the selected game;
sending a message to each invitee computing device of the list of invitee computing devices, the message including a preliminary invitation to the multiplayer gaming session to each invitee of the list of invitees, the preliminary invitation configured to interrupt performance of a current activity of the invitee computing device;
receiving, at the host computing device, an indication that at least one invitee computing device has launched the selected game;
selecting, by the host computing device, game configuration options from the generated group of game configuration options based on the list of invitee computing devices and the selected game; and sending, by the host computing device, a final invitation to the multiplayer gaming session to each invitee computing devices.

2. The method of claim 1, wherein the group of game configuration options is generated by retrieving a configuration file from the memory.

3. The method of claim 2, wherein the configuration file includes parameters for game configuration options particular to the selected game.

4. The method of claim 2, wherein the memory is a database in communication with the host computing device.

5. The method of claim 2, wherein the configuration file is included in a software program of the selected game.

6. The method of claim 1, wherein the selected game is simultaneously launched on the invitee computing device of the at least one selected invitee while the host computing device selects the game configuration options.

7. The method of claim 6, wherein the multiplayer gaming session is loaded with the selected game configuration options on the invitee computing device of each invitee computing device of the list of invitee computing devices after receiving the final invitation.

8. The method of claim 1, wherein the selected game is automatically launched on the invitee computing device of each invitee of the list of invitees upon receiving the preliminary invitation.

9. The method of claim 1, wherein the selected game is launched in the background on the invitee computing device of the at least one selected invitee while a second application is running in the foreground.

10. The method of claim 1, wherein the generated game configuration options are displayed and selected in a user interface of a native operating system.

11. The method of claim 1, wherein the selected game is launched on the host computing device after selecting the game configuration options.

12. A non-transitory computer-readable storage medium storing a computer program to set up a multiplayer gaming session, the computer program comprising executable instructions that cause a computer to:
store a plurality of multiplayer games in a memory;
initiate a multiplayer gaming session by a host computing device via a network connection based on a user input;
generate a list of games based on the storing;
receive an input indicating a selected game from the list of games;
determine a list of invitee computing devices based on the network connection;
generate a group of game configuration options for the selected game by the host computing device based on the selected game;
send a message to each invitee computing device of the list of invitee computing devices, the message including a preliminary invitation to the multiplayer gaming session to each invitee of the list of invitees;
receiving, at the host computing device an indication that at least on invitee computing device has launched the selected game on an invitee computing device of each invitee of the list of invitees;
select game configuration options from the generated group of game configuration options based on the list of invitee computing devices and the selected game; and
send a final invitation to the multiplayer gaming session to each invitee computing device.

13. The non-transitory computer-readable storage medium of claim 12, wherein the group of game configuration options is generated by retrieving a configuration file from the memory.

14. The non-transitory computer-readable storage medium of claim 12, wherein the memory is a database in communication with the host computing device.

15. The non-transitory computer-readable storage medium of claim 12, wherein the configuration file is included in a software program of the selected game.

16. The non-transitory computer-readable storage medium of claim 12, wherein the selected game is simultaneously launched on the invitee computing device of the at least one selected invitee while the host computing device selects the game configuration options.

17. The non-transitory computer-readable storage medium of claim 16, wherein the multiplayer gaming session is loaded with the selected game configuration options on the invitee computing device after receiving the final invitation.

18. The non-transitory computer-readable storage medium of claim 12, wherein the generated game configuration options are displayed and selected in a user interface of a native operating system.

19. A host computing device for setting up a multiplayer gaming session, the host computing device comprising:
a game session generator configured to
initiate a multiplayer gaming session,
generate a list of games, and
select a game from the list of games;
an invitee generator configured to determine a list of invitees;
a game configuration generator configured to
generate a group of game configuration options, and
select game configuration options from the generated group of configuration options; and
an invitation transmitter configured to
send a preliminary invitation to the multiplayer gaming session to each invitee of the list of invitees,
launch the selected game on an invitee computing device of each invitee of the list of invitees, and
send a final invitation to the multiplayer gaming session to each invitee of the list of invitees.

20. The host computing device of claim 19, wherein the game configuration generator retrieves a configuration file from a storage medium, the configuration file including parameters for game configuration options particular to the selected game.

* * * * *